(12) United States Patent
Bucior, III et al.

(10) Patent No.: US 11,875,295 B2
(45) Date of Patent: Jan. 16, 2024

(54) VIDEO SUBMISSION SURVEY REVIEWER DEVICE, SYSTEM, PROCESS, AND COMPUTER PROGRAM PRODUCT

(71) Applicant: Florida State University, Tallahassee, FL (US)

(72) Inventors: Andrew Paul Bucior, III, Tallahassee, FL (US); William Henry Lindner, III, Tallahassee, FL (US); Richard Rome Burnette, III, Tallahassee, FL (US); Yaacov Petscher, Tallahassee, FL (US); Peter Paul Butler, Jr., Tallahassee, FL (US)

(73) Assignee: Florida State University, Tallahassee, FL (US)

( * ) Notice: Subject to any disclaimer, the term of this patent is extended or adjusted under 35 U.S.C. 154(b) by 641 days.

(21) Appl. No.: 16/836,948

(22) Filed: Apr. 1, 2020

(65) Prior Publication Data
US 2020/0320457 A1    Oct. 8, 2020

Related U.S. Application Data

(60) Provisional application No. 62/828,179, filed on Apr. 2, 2019.

(51) Int. Cl.
*G06Q 10/0639*   (2023.01)
*G06F 3/04847*   (2022.01)
*G06F 16/74*   (2019.01)
*H04N 21/454*   (2011.01)

(52) U.S. Cl.
CPC ... *G06Q 10/06393* (2013.01); *G06F 3/04847* (2013.01); *G06F 16/74* (2019.01); *G06F 16/743* (2019.01); *G06Q 10/06395* (2013.01); *H04N 21/454* (2013.01); *H04N 21/4542* (2013.01)

(58) Field of Classification Search
CPC ........ G06Q 10/06393; G06Q 10/06395; G06F 3/04847; G06F 16/74; G06F 16/743; H04N 21/454; H04N 21/4542
See application file for complete search history.

(56) References Cited

U.S. PATENT DOCUMENTS

| | | | |
|---|---|---|---|
| 7,540,009 B1 * | 5/2009 | Bryant | H04N 7/16 |
| 2004/0095376 A1 * | 5/2004 | Graham | G09G 5/00 |
| 2012/0304230 A1 * | 11/2012 | Harwell | H04N 21/472 |
| 2013/0096985 A1 * | 4/2013 | Robinson | G06Q 30/0203 |

* cited by examiner

*Primary Examiner* — Anthony Bantamoi
(74) *Attorney, Agent, or Firm* — FisherBroyles LLP; Anthony J DoVale; James Pohl (57) ABSTRACT

Video submission survey reviewer device, system, process, and computer program product capable of recording campaign or survey content including video, analyzing the recorded content, and synthesizing information about the recorded content to provide improved and more efficient analysis or curation and presentation of the processed data and its associated information.

21 Claims, 5 Drawing Sheets

VIDEO SUBMISSION SURVEY REVIEWER DEVICE, SYSTEM, PROCESS, AND COMPUTER PROGRAM PRODUCT

CROSS-REFERENCE TO RELATED APPLICATION

The present application claims priority to U.S. Provisional Patent Application No. 62/828,179, entitled, "Video Submission Survey Reviewer Device, System, Process, and Computer Program Product," by Andrew Paul BUCIOR III et al., filed Apr. 2, 2019, incorporated by reference herein in its entirety.

BACKGROUND

Field of the Invention

The invention relates to surveys, in particular to recording survey content including video information, analyzing the recorded content, and synthesizing information about the recorded content to provide improved and more efficient analysis or curation and presentation of the processed data and its associated survey information.

Description of Related Art

The ability to capture personal video and upload to a server is commonplace. The back-end administrative and curation process required to produce usable analytics is both time consuming and inefficient, and often requires manual effort. For example, in a university environment it is commonplace for the institution to distribute student surveys through a paper driven system to get feedback on professors and class quality. The paper driven system is limiting, in that there is no ability to capture tone, bias, or emotionality from the response.

Extracting information from free form video submission responses requires a significant investment in manpower. Due to the time involved, the information that can be extracted in a timely and useful way is limited. Microsoft's Video Indexer service extracts a transcript, objects visible in the video, common phrases in the video, sentiment, adult content from video content. Still, in the current state, administrators are required to manage multiple application flows, and must become masters of the cumbersome. With the advent of transcription, sentiment analysis, object detection, etc. being made available as commodity cognitive services from major vendors, the amount of manpower required is reduced, however there is room for improvement.

BRIEF SUMMARY

Described herein are embodiments of video submission survey reviewer device, system, process, and computer program product capable of recording campaign or survey content including video, analyzing the recorded content, and synthesizing information about the recorded content to provide improved and more efficient analysis or curation and presentation of the processed data and its associated information. The summary is presented for reader convenience and does not limit the rest of the embodiments of the disclosure.

BRIEF DESCRIPTION OF THE DRAWINGS

A more complete appreciation of the disclosure and many of the attendant advantages thereof can be readily obtained as the same becomes better understood by reference to the following detailed description when considered in connection with the accompanying drawings, wherein.

DETAILED DESCRIPTION

As used herein, an element or step recited in the singular and proceeded with the word "a" or "an" should be understood as not excluding plural elements or steps, unless such exclusion is explicitly recited. Furthermore, references to "an embodiment" of the present disclosure are not intended to be interpreted as excluding the existence of additional embodiments that also incorporate the recited features. Embodiments described herein provide example structures which are intended to cover existing technological implementations as understood at the time of filing, or a present or future equivalent thereof "Any one or more of:" means, for example, when stated as "any one or more of: A, B, C" means A, or B, or C, or A and B, or A and C, or B and C, or A and B and C.

Embodiments can provide practical applications including any one or more of: providing more useful information from the data, providing faster access to the information from the data, or providing the information more quickly and more intuitively, as an improvement to survey technology.

Embodiments of the disclosure capture video, analyze video content, and synthesize the associated data into usable/actionable information in real time. With embodiments of the disclosure, video submissions are assessed and synthesized with algorithms that provide improved analysis including prosodic sensitivity analysis, bias scrutinization analysis, intonation analysis, and the ability to identify discrepancies through data interrogation. With a toolset having service capabilities that capture and processes tone, themes, and sentiment, organizations can have the capability to streamline their understanding of constituents, and respond more quickly to specific campaigns/polls.

In an embodiment, sentiment includes a view of or attitude toward a situation or event; an opinion; a feeling or emotion. In an embodiment, prosodic sensitivity analysis can include analyzing elements of speech that are individual phonetic segments and that are not individual phonetic segments but are properties of syllables and larger units of speech, e.g., linguistic functions such as intonation, tone, stress, and rhythm.

Embodiments of the disclosure can provide students participating in the same survey, provided an intuitive and easier to use video submission tool. Once respondents' submissions are completed, the university can have access to improved data including more detailed, rich data sets, with content summaries (e.g., presented by individual, by department or demographic), that are accessible and actionable more quickly than before, e.g., in real-time, such as within minutes of the submission.

With embodiments of the disclosure, increasingly sophisticated consumers (e.g., students, constituents, customers, respondents) can more easily provide input, and campaigns and surveys can produce more real-time metrics. Because what a consumer says and what they are actually wanting to convey are often two separate messages, important information can be lost. By coupling video survey responses with embodiments of the disclosure better results can be produced by, for example, having additional data, such as tone, theme, and sentiment, or other data produced from other analysis described herein. Embodiments described herein can provide institutions more a robust and reliable data set to quantify the perspective of its users in real-time.

An embodiment of the present disclosure can provide a video submission survey reviewer device including web service interface circuitry configured to receive processed video submission content, wherein the content was processed with an authentication verification process, and the content was processed to determine whether the processed video submission content included a notification of a plurality of any two or more of the following types of notifications: a notification whether the received processed video submission content can be displayed publicly, a notification of whether there is objectionable content in the received processed video submission content, a notification of a particular object detection in the received processed video submission content, a notification of common phrases in the received processed video submission content, a notification of there being prosodic sensitivity analysis data in the received processed video submission content, a notification of there being a particular type of sentiment in the received processed video submission content, along with a transcription of the received processed video submission content; web service interface circuitry configured to receive only the received processed video submission content which had passed the authentication verification process; web service interface circuitry configured to receive the at least two of the types of notifications made as a result of the processed received processed video submission content; web service interface circuitry configured to present the received processed video submission content, along with the at least two of the types of notifications and at least more information of the at least two of the types of notifications; and web service interface circuitry configured to receive a reviewer selection indicating a desire to start a review of the received processed video submission content. For example, "two of the types" includes a notification whether the received processed video submission content can be displayed publicly and a notification of whether there is objectionable content in the received processed video submission content; etc.

Embodiments of devices, methods, and systems described herein can be implemented using computer programming or engineering techniques including computer software, firmware, hardware, circuitry, or any combination or subset thereof, wherein the technical effects can include any one or more of: a video submission survey reviewer device including web service interface circuitry configured to receive processed video submission content, wherein the content was processed with an authentication verification process, and the content was processed to determine whether the processed video submission content included a notification of a plurality of any two or more of the following types of notifications: a notification whether the received processed video submission content can be displayed publicly, a notification of whether there is objectionable content in the received processed video submission content, a notification of a particular object detection in the received processed video submission content, a notification of common phrases in the received processed video submission content, a notification of there being prosodic sensitivity analysis data in the received processed video submission content, a notification of there being a particular type of sentiment in the received processed video submission content, along with a transcription of the received processed video submission content; web service interface circuitry configured to receive only the received processed video submission content which had passed the authentication verification process; web service interface circuitry configured to receive the at least two of the types of notifications made as a result of the processed received processed video submission content; web service interface circuitry configured to present the received processed video submission content, along with the at least two of the types of notifications and at least more information of the at least two of the types of notifications; and web service interface circuitry configured to receive a reviewer selection indicating a desire to start a review of the received processed video submission content.

The disclosure includes embodiments capable of recording campaign or survey content including video, analyzing the recorded content, and synthesizing information about the recorded content to provide improved and more efficient analysis or curation and presentation of the processed data and its associated information, to provide practical applications including any one of: providing faster access to the information from the data, providing more useful information from the data, or providing the information more quickly, as an improvement to survey technology.

Figure 1:
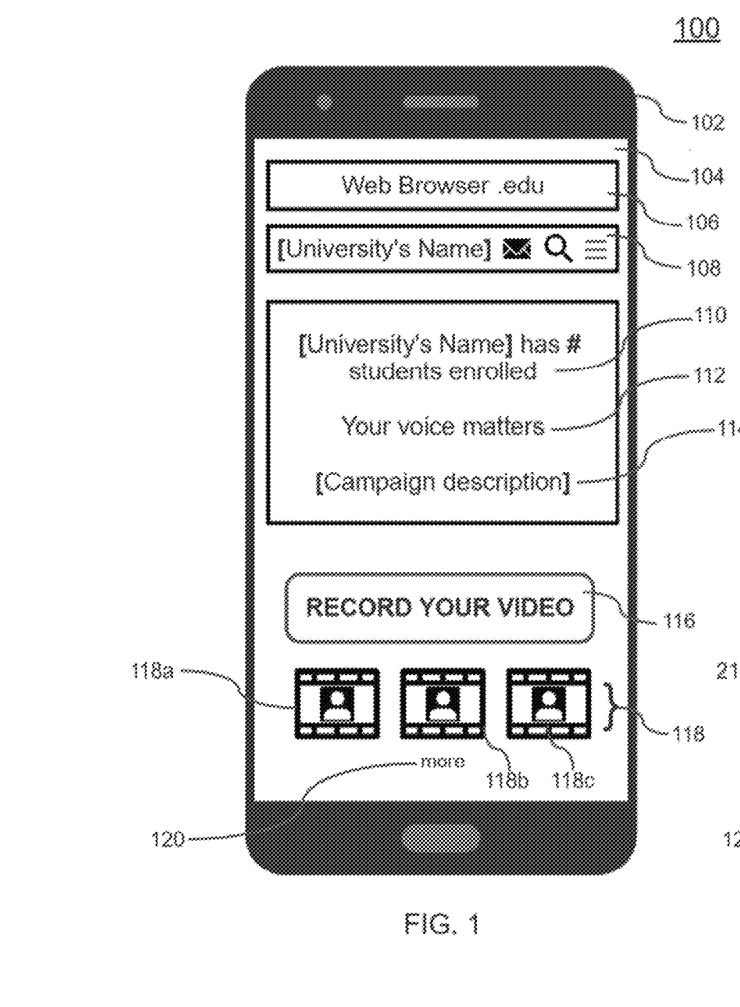
FIG. 1 illustrates an embodiment of a survey prompt terminal graphical user interface (GUI).

The drawings are provided to illustrate some embodiments and not intended to limit the embodiments. In the drawings, like reference numerals designate identical or similar or corresponding parts throughout example embodiments. FIG. 1 illustrates an embodiment of a user interface including a survey prompt terminal graphical user interface (GUI). A terminal 100 in an example system embodiment of the invention can be a device, such as a mobile device, or other device with similar architecture, such as component architecture (e.g., 605). Other embodiments of a terminal 100 include other types of user communication devices having a user interface, such as laptops, tablets, computers, digital watches, etc., or equivalents thereof which can include or have an associated camera recording device or capability. Terminal 100 includes an example survey GUI 102. GUI 102 includes a start survey screen instance 104. Start survey screen instance 104 can include a uniform resource locator (URL) indication 106, a navigation bar 108, an informational message 110, a prompt message 112, a survey or campaign description 114, an initiation of survey selection, such as a start survey selection button 116. An example prompt message 112 can be, e.g., "Your voice matters. Show us how we can reimagine the campus experience." Another example of a survey prompt message 112 can be any one or more of: "Would you like [some reward] for submitting your opinion?" or another "Review your instructor for [reward]" or any other prompt. Start survey screen instance 104 can also include one or more previous video submission selections 118 for a potential respondent to view. After a respondent becomes familiar via the presented familiarity inducing information (e.g., any of 110, 112, 114, or any combination thereof) or familiarity inducing selection (e.g., 118*a*, 118*b*, 118*c*, etc., and others accessible via a "more" selection 120) of the start survey screen instance 104, the respondent can initiate participation, by for example, submitting a start indication, such as selecting the start survey selection button 116.

A GUI 102 described herein includes a web service interface or other system or device interface. In an embodiment, a terminal 100 can transmit information including where a service which provides the GUI 102 is located (IP address) and/or the message format used by the service. In an embodiment, a terminal 100 can transmit information including a service description containing e.g., Interface Name, Operation Name(s) (if the service has more than one operation), Operation Input Parameters, Operation Return Values, Service Message Format, Service Location (IP Address/URL) information.

Upon determination to submit a video, a prompted survey respondent can create video content using an available application or software tool made available by the terminal or offered remotely from the system. For example, a video respondent can complete the recording of the video content on the terminal device. The video respondent can follow steps which can include identifying which video content to upload for survey submission. A video respondent can upload the recorded video survey input via the GUI by initiating the submission by, for example, selecting a video survey submission upload button thereby generating a video submission.

Figure 2:
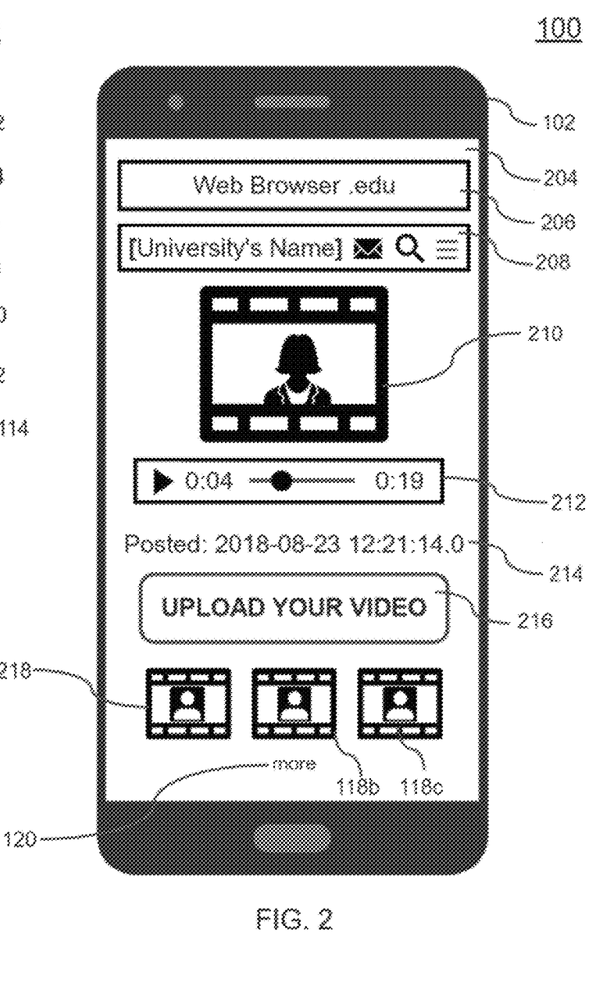
FIG. 2 illustrates an embodiment of a survey video submission terminal GUI.

FIG. 2 illustrates an embodiment of a survey GUI 202 including a submission screen instance 204. The example submission screen instance 204 can include a navigation bar 208 and URL information 206. The example submission screen instance 204 can include video recording and display selection 210. Video recording and display screen selection 210 can be used to start a recording using local or remote video recording and display hardware, software, circuitry, or services. The respondent can have an opportunity to review the recorded survey video via a view bar 212 before submission and can rerecord it. If the respondent decides to want to submit the video response, she can upload or submit the final version 218 of the video submission by making a submit or upload indication, such as selecting a submission button 216. The final version 218 can be displayed as completed along with previous video submission selections 118 for review. If the respondent had selected the submission button 210 to upload or submit the respondent video submission information of the final version 218, the terminal 100 can indicate posted information 214, such as a time of posting on the submission screen instance 204.

The respondent video submission information can include video data and associated audio data that was made during the recording by use of the video recording and display screen selection 206. The respondent video submission information can include the respondent video submission information of the video data and the associated audio along with any additional secondary submission information. Additional secondary submission information includes any one or more of: meta data, browser type information, video size information, video type information, or other non-listed conventional video information; or any combination thereof. Additional secondary submission information includes any other data obtained from the respondent.

In an embodiment, the video submission information can not include other data input besides the video data. In an embodiment, the video submission information can not include other data input besides the video data and its associated audio data. In an embodiment, the video submission information can include metadata which is associated with the respondent making the video submission without her having to take an additional step to provide the additional data. In an embodiment, the video submission information can include any one or more types of respondent data described herein. Video submission information can include transcoded video submission information which was transcoded by a transcoder device. For example, transcoded video submission information can include mp4 format and an extracted thumbnail image.

Embodiments of the disclosure can increase the speed or timeliness and use of the submitted data and information garnered or curated from the video submission information, such as any one or more of: transcription, sentiment analysis, object detection, etc. being made available as commodity cognitive services from vendors having devices or systems communicatively coupled and integrated into an embodiment of the system or particularly integrated components configured specifically into an embodiment of the system, or any other data described herein so that the amount of manpower required to obtain the additional information is dramatically reduced.

Embodiments of the invention enable administrators of the survey to not have to manage multiple application flows or have access to a plurality of disassociated systems in order to obtain the desired information. Embodiments of the disclosure can enable administrators of the survey to not have to take multiple cumbersome steps to obtain the information they desire.

Embodiments of the disclosure can integrate a plurality of functionality to control or access produced system information via a terminal GUI. Additionally, embodiments of the disclosure can provide a new approach to content review and examination including enhanced transcription through a combination of audio and lip-reading in video. Embodiments of the disclosure can provide a reviewer additional and improved presentation of information ahead of the review process to enable the reviewer to be able to more rapidly review the responses. Embodiments of the disclosure include embodiments of a reviewer terminal GUI which can save a reviewer's time by enabling the reviewer to focus on actions, decisions, corrections or enhancing the data collected by using embodiments of the invention.

Figure 3:
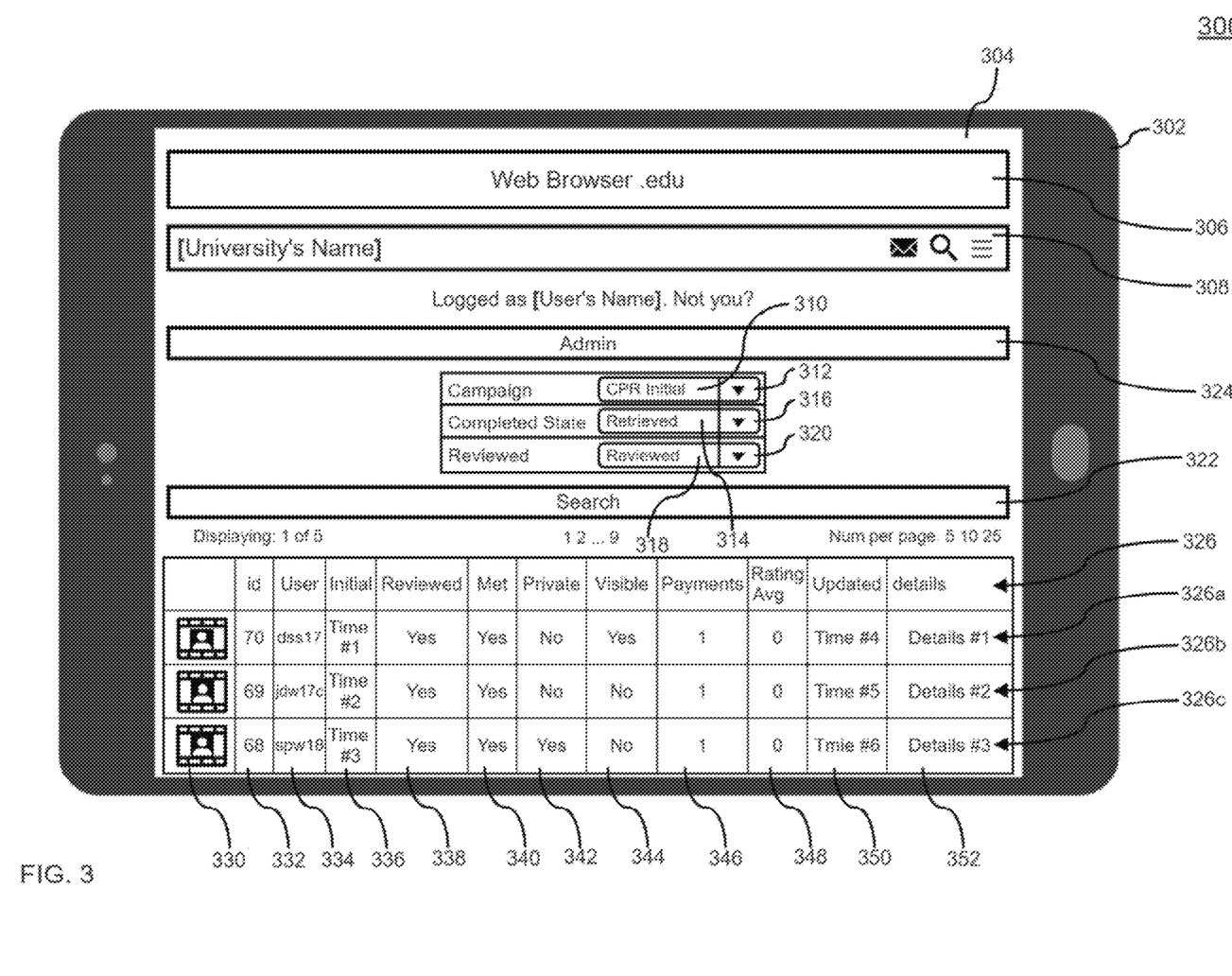
FIG. 3 illustrates an embodiment of a video submission survey review terminal GUI.

FIG. 3 illustrates an embodiment of a survey review terminal 300 and its GUI 302. In the example review terminal GUI 302, the reviewer can be presented with a reviewer screen instance 304. An embodiment of a reviewer screen instance 304 can include filter settings including a survey or campaign selection, a reviewed state selection. For example, a reviewer screen instance 304 can include its URL information 306 and a navigation bar 308. The example reviewer screen instance 304 can include a survey or campaign selection device, such as a survey scroll selection indication 310 made available by a survey scroll option 312. The example reviewer screen instance 304 can include a completion state selection device, such as a completion state scroll selection indication 314 made available by a completion state scroll option 316. The example reviewer screen instance 304 can include a review state selection device, such as a review state scroll selection indication 318 made available by a review state scroll option 320. For example, a reviewer can select a desired campaign review status, such as "Completed" or "Reviewed" or "Not reviewed" or any other desired campaign reviewer selection.

The example reviewer screen instance 304 can show an Admin view. View selection device 324 can be set by the reviewer to show different views, such as an overall administrator view, group administrator view, campaign administrator view, campaign reviewer view (shown), Response Viewer view, Respondent view or Public View.

In an embodiment, an instance of a reviewer interface screen 304 includes a list of one or more processed respondent video submission information. In the example review terminal GU 302, the reviewer can be presented with processed respondent video submission information result headings 326 along with each display result of the processed respondent video submission information, e.g., 326a, 326b, 326c, etc. For example, review presentation information output can include processed respondent video submission information, which can include any one or more of: submitted survey video data, submitted survey audio data, combined submitted video and audio data 330, submitted or assigned survey video id 332, submitted survey video user id 334, submitted survey video recording submission timestamp 336, submitted survey video review status 338, submitted survey video authentication status or eligibility status 340, submitted survey video privacy setting 342, submitted survey video visibility setting 344, submitted survey video reward or payment setting 346, submitted survey video reviewer set rating or other rating 348, submitted survey video updated time stamp 350, submitted survey video detail notes 352, etc.

Freeform responses, such as a video survey submission, and in particular video, have the potential to contain objectionable content, such as nudity or profanity. Exposure to said content without warning can result in emotional trauma. Object detection/recognition capabilities are built into embodiments of the disclosure which can provide warnings to reviewers ahead of viewing the response. Embodiments include transcription which can provide warnings to reviewers ahead of viewing the response. Having detection performed by embodiments including transcription and processing including detection provides a warning or other result or notification that enable a reviewer to maintain some distance from the actual content of the response. Offensive content can be further limited in embodiments of the disclosure through the inclusion of an authentication mechanism as individuals are far less likely to behave poorly without anonymity.

A survey can include a grouping association with the prompt. For example, a campaign can be associated with the prompt to which the individuals are responding. The association includes additional configuration to enable various capabilities. For example, there can be a desire to offer the campaign during a fixed timeframe, or there can be a need to only collect responses from individuals that meet a particular criterion or criteria (e.g., only students, customers, participants, etc.). Eligibility of the respondent can be checked in accordance with survey or campaign restrictions.

A group can be a unifying concept for a collection of campaigns. A group can also be associated with an owner assigned to the campaign. For example, a group might be a particular class (e.g., ENC1101) and its associated campaigns can be prompts related to that class, such as, e.g., "How did the reading make you feel?" An owner can be the instructor of the class or other administration official or reviewer type.

Figure 4:
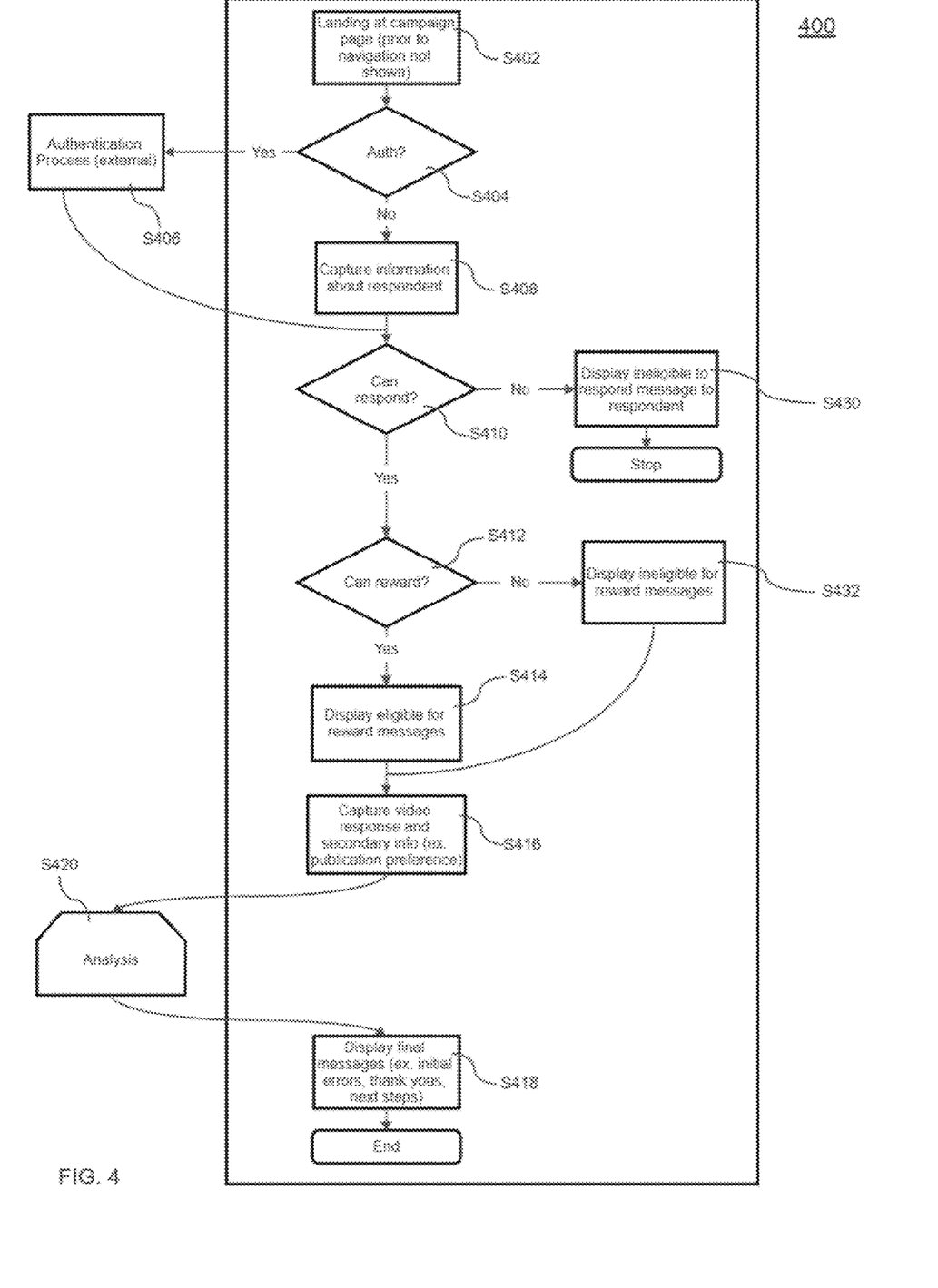
FIG. 4 illustrates an embodiment of a video submission survey procedure.

Individual respondents are unlikely to respond unless the perceived benefit outweighs the level of effort required. Not only can embodiments of the disclosure streamline the process (no paper, or cumbersome submission requirements), which is a benefit to the user, but the offering can also include a module device or service to reward individuals for providing feedback, thus making them more likely to respond. For example, an embodiment of a system 400 of the invention can include a reward determination device with circuitry configured to deliver virtual rewards (e.g., student points like garnet bucks at Florida State University) to students. Embodiments of the invention can also support other rewards in different contexts (ex. extra credit in a class, discounts, cash or other forms of payment (e.g., gift card), etc.).

Figure 5:
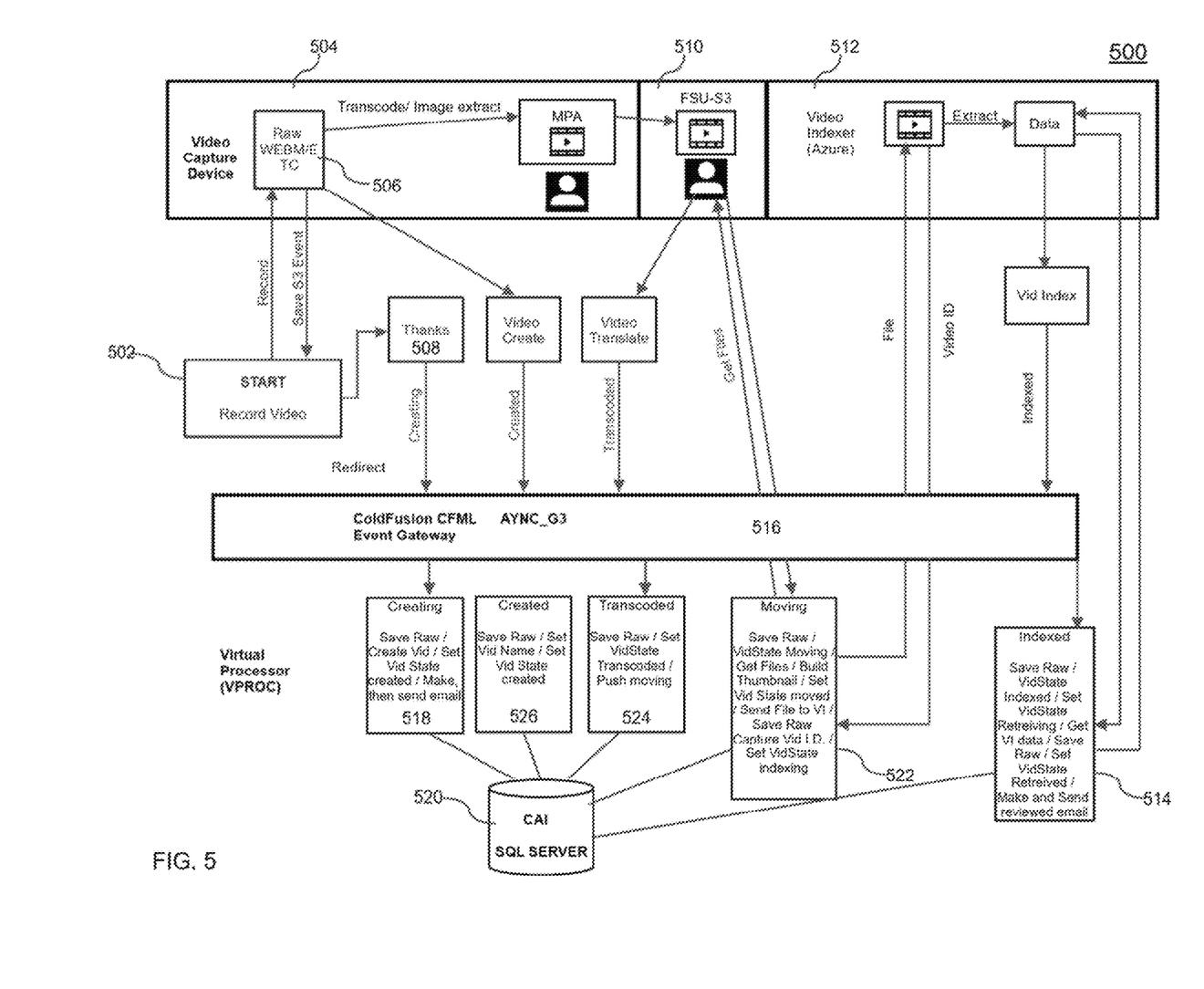
FIG. 5 illustrates an embodiment of a survey system example architecture.
Figure 6:
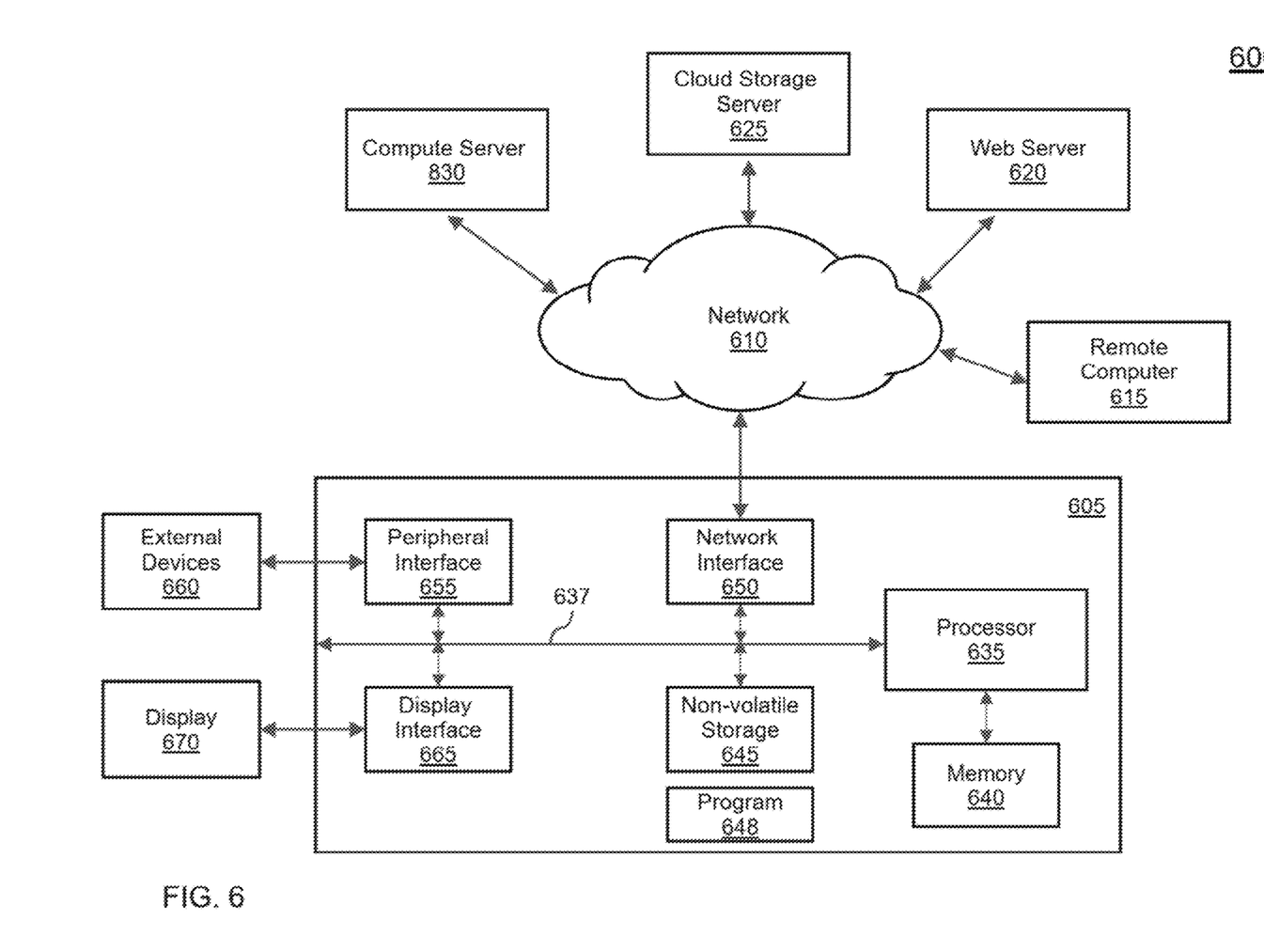
FIG. 6 illustrates an embodiment of component architecture of a survey controller device and other devices in the survey system device example architecture.

FIG. 4 illustrates an embodiment of a survey procedure, such as a video submission reviewer system procedure 400 that can be executed by software, hardware, and circuitry combinations, as shown in for example the system architecture 600 illustrated in FIG. 6 or other architectures of a terminal device or other device of the system, for example, a device depicted by functional blocks illustrated in FIG. 5.

In an embodiment, video submission reviewer system includes devices capable of performing procedure 400 including obtaining respondent authentication information (S402) and verifying whether the respondent submitted credentials are authenticated (S404). Authentication processing (S406) can be performed locally or remotely or by an external third-party authentication service. If authenticated by a positive authentication result after verification of the respondent authentication information of the respondent was successful, then further information can be obtained from the respondent, such as receiving and checking respondent eligibility information (S408). If the respondent is eligible to take the particular survey by receiving a positive eligibility result (S410), then respondent information can be checked for association with a reward program eligibility (S412). If the respondent information receives a positive indication for a reward program, then the one or more reward programs and details can be presented to the respondent (S414). The respondent can make and submit reward selections to be awarded upon completion, or upon both completion and review by a reviewer.

A video survey submission can include information received from the survey respondent or a type of respondent who was directed to an internet site hosted by a remote server or other hosting device. An embodiment of the procedure can cause the respondent to be directed to a particular campaign. The prompted survey respondent can also navigate through available groups and campaigns to select a desired survey or campaign.

Embodiments of the disclosure can integrate with one or more authentication devices or systems. For example, if an input from an administrator indicates authentication is required in order to allow receipt of a submitted response, the example system can integrate with authentication device or system, which is external to the site hosting platform devices. For example, embodiments of the disclosure can be secured with a single sign-on protocol known as a Central Authentication Service device or system, which permits a user, such as a prompted survey respondent or an unprompted survey respondent to navigate to establish access to multiple applications, while providing their credentials (userid/password) only once. A single authentication association to multiple applications can improve the efficiency in survey technology.

Referring back to FIG. 4, a respondent who desires to submit a video submission, can provide authentication input via an embodiment of a survey video submission terminal GUI, for example as described with reference to FIG. 1 and FIG. 2. The authentication input can be verified by an external authentication device or system using an external authentication process, which is communicatively coupled to the system. If other authentication is required, an embodiment of the system can verify the authentication input locally at a device hosted by the platform architecture hosting the system including the terminal. Authentication verification information can be received and verified by the system. If the Authentication verification information indicates invalid credentials, the submission terminal GUI can present an illegibility message on the GUI (S430)). If the Authentication verification information indicates valid credentials or input was submitted, the submission terminal GUI can receive and present reward information for the authenticated respondent (S408). If the reward information is indicative of an ability to receive a reward, then the system can display the eligible reward information to the authenticated respondent (S414) to obtain selection input. Alternatively, if the reward information is indicative of an ability to receive a reward, then the system can display the eligible reward information to a reviewer, or to both the reviewer and the authenticated respondent. When the respondent's general eligibility to submit a response or receive a reward for the campaign is confirmed, the status can be presented (S414). Individuals ineligible to submit a response can be notified (S432) and stopped. Information about the response, and the respondent, can be encrypted at any time, such as throughout the remainder of the process.

The respondent can be prompted anywhere throughout the process to provide secondary submission information (e.g., S416) including for example necessary context (submission guidelines, terms and conditions, etc.) which the respondent confirmed or which the respondent submitted knowingly or which was associated with the respondent automatically by the terminal. The respondent can indicate whether the response can be displayed publicly. Secondary submission information can include other data acquired throughout the respondent information processing, such as any information gathered as a result of accepting terms of service or other information gathering techniques including a respondent providing express or implied submission. Other examples of secondary submission information include any one or more of: meta data, browser type information, video size information, video type information, other conventionally acquired information. For example, the respondent can be prompted for secondary submission information before or after or during the example 104 or 204 screen instances or other screen instances which are described herein but not shown.

A respondent can provide video input such as respondent video submission information to embodiments of the disclosure through a video capture tool, e.g., a cross-browser video capture device or tool, for example, Pipe. In any case, the respondent video submission information can be captured and submitted for review (S416). Once the response is captured and submitted, or captured, submitted, and reviewed, a thank you message can be sent via email to the respondent, or other notification or can displayed on the terminal, and such can for example include information of expected timing for review and reward delivery (S418).

In an embodiment, when the video submission is submitted for review, it can contain respondent video submission information including any one or more of: video data, associated audio data, associated publication preference (i.e., private or public), and associated user id data. In an embodiment respondent video submission information can include video data, associated audio data, and associated secondary submission information. In an embodiment, secondary submission information can include and one or more of: publication preference (i.e., private or public), associated user id data, meta data, browser type information, video size information, video type information, other non-listed conventional video information, or equivalent thereof. After a submission is made the respondent video submission information can be processed (S420).

Video submission processing can include any one or more of: the functions depicted in the block diagram of FIG. 5. For example, video submission review processing can include any one or more of: audio review analysis, video review analysis, objectionable content review analysis. The respondent video submission information can be synthesized or processed with formatting to produce formatted video submission information to include the respondent video submission information along with any additional secondary submission information. The formatted video submission information can include transcoded video submission information. For example, the transcoded video submission information can include mp4 format. For example, the transcoded video submission information can include extracted thumbnail image. Embodiments include video synthesis circuitry configured to synthesize additional secondary submission information with the formatted video submission information, as described herein.

FIG. 5 illustrates an embodiment of a survey system example function block architecture 500 wherein each function block or part thereof can be executed by software and/or hardware and/or configured circuitry. Once a video response is entered or video submission is provided at the terminal 100 at function block 502, the submitted content can be processed locally or remotely. For example, remote processing can occur at a cross-browser video capture device 502 or tool. Processing can include first transcoding the video to mp4 and extracting a thumbnail image from the video by a transcoder 506. Processing can include using a cross-browser video capture device 502 or tool, for example, e.g., Pipe, which can be configured to perform capture with custom code collecting the results, and moving them from a remote storage, for example, Simple Storage Service (S3) to a more local server (510) of the system so the transcoded video content is available after transcoded by transcoder 524 for subsequent processing. In an embodiment, the system can provide a message to the respondent via the survey video submission terminal GUI after receiving a Save S3 event to produce for example a message (e.g., a thank you) with responder device 508.

Processing of the respondent video submission information can be run through one or more cognitive service devices 512 or systems to extract additional information. For videos, video review processing of the respondent video submission information can include any one or more of: producing a transcript, determining an object visible in the video, determining a common phrase(s) in the video, sentiment, determining adult content, etc. Cognitive service devices include artificial intelligence processing. In an embodiment, a cognitive service device 512 includes Microsoft's Video Indexer service which can be used to extract content and produce index information. After the video's initial processing is complete, reviewers for the campaign can be notified with a message via the survey video submission terminal GUI.

In an embodiment, issuing rewards for responses can be performed as an additional process device 514 that can run daily or on business days or another type of schedule. Videos which have received an indication of having been marked as reviewed and as having an indication of being qualified for a reward can be submitted or translated to third party reward identifiers with the associated type of reward or reward amount to be distributed. When the reward is sent, changes to that reward can be locked if for example there is allowing only a single award for a given response. Alternatives to batch approaches can be available through embodiments of the disclosure for rewards which support real-time distribution.

Event gateway device 516 is capable of notifying or detecting when particular events which were analyzed for elements are found. Example embodiments of a detection can produce a notification of any one or more of: a notification whether the received processed video submission content can be displayed publicly, a notification of whether there is objectionable content in the received processed video submission content, a notification of a particular object detection in the received processed video submission content, a notification of common phrases in the received processed video submission content, a notification of there being prosodic sensitivity analysis data in the received processed video submission content, a notification of there being a particular type of sentiment in the received processed video submission content, and others.

Reviewer Procedure

Reviewers can be directed to the administrative site device of the system and, after reviewer authentication, a reviewer can navigate to an appropriate campaign to review verified video submission responses. Reviewer authentication services and devices can be the same or different from the respondent authentication services and devices. A reviewer can be limited to only access an associated specific assigned group(s) and/or campaign(s), and are provided a video reviewer terminal GUI with an embodiment of a default view which can include a listing of as-yet-unreviewed responses and can include additional navigation options (search, etc.). As described above, an embodiment of a survey review terminal 300 GUI e.g., 302. is illustrated in FIG. 3.

The reviewer can select a response, such as a processed respondent video submission information 326a and begin the review process. The GUI 302 can show if the video submission response includes objectionable material under the details heading 326 or other heading (not shown) in screen instance 304. As the reviewer proceeds through the review process, he can provide a rating 346 for the video submission response, such as the processed respondent video submission information 326a, and he can indicate if the reward is met 340 for the video submission response, and he can add any comments under the details heading 326 or other heading (not shown) in screen instance 304 about the video submission response, which can be useful for indicating the current state of the review process to other reviewers. Also, the reviewer can indicate whether the video submission response could be visible publicly 344. For example, the public view can be for campaigns which support displaying specific responses to the public. If the video respondent indicated that the submission should be kept private, the option for public display can be disabled. Once the reviewer is satisfied that the review is complete, the reviewer can mark the submission as reviewed 338. The reviewer also can indicate if another user could or should view the video submission response (e.g., sending a notification to the head of a department of a particular issue visible in a video submission response) which is not shown but could be included as an additional review required selection on screen instance 304.

Video submission reviewers can be directed by an administrative site device of the system and, after authentication, a reviewer can navigate to an appropriate campaign to review verified video submission responses. Reviewers include different reviewer types with different level access and types of review responsibility. Below is listed example of embodiments of different reviewer types and the associated level access and types of review responsibility, any of which can be configured into the system.

Reviewer Type Terminology

Overall Administrator

Superuser level access. The user can maintain groups and their associated administrators.

Group Administrator Reviewer Type

Administers group settings (some look and feel, branding, core text, etc.). Can maintain campaigns and their associated administrators (if specified) in addition to performing lower level actions.

Campaign Administrator Reviewer Type

Administers campaign settings (descriptions, constraints, messaging, available rewards and associated settings, etc.) and can set specific reviewers for the campaign.

Campaign Reviewer Reviewer Type

Can review specific responses, correct extracted information if necessary (corrections of transcripts, sentiment, etc.), set reviewed states and ratings, manually set topics, and determine rewards. Can provide access to specific responses to response viewers despite review status and privacy constraints.

Response Viewer Reviewer Type

Can view specific responses that they have been explicitly been granted access to. Can provide comments which will not be publicly visible.

Video Submission Respondent Reviewer Type

Provides the video submission response and can review video before submission.

Public Reviewer Type

Can view reviewed and public responses.

Referring back to FIG. 5, each data transmission can occur as data is processed by each individual component device and the transmission can be sent to the next device for processing in system 500. In an embodiment, some or all of the data transmissions can occur simultaneously. Embodiments of the procedures described herein can be executed by any combination of hardware, software, and circuitry in components of the devices which are included in system 500.

In an embodiment, the device labelled "Record" can be a recorder device 502, such as a smartphone or other video terminal device capable of presenting one of the above described survey video submission terminal GUIs. The video submission can be transmitted with a transmission to a transcoder/image extractor device 504 which can convert the video submission from a video format, such as raw, etc., to, for example a transcoded video format such as e.g., mp4 format. The video submission can also be used to extract a thumbnail view from it. A transmission can be produced from the transcoder/image extractor device 504 to a S3 device 510.

The video submission can be transmitted with a transmission from the recorder device to a video creation device for storage or processing. The video submission can be transmitted with a transmission from the video creation storage device to an event gateway device 516, such as a ColdFusion CFL device or an ASYNC_G3 device. In an embodiment, an event gateway device 516 is an event router designed for event-driven, serverless architectures, which is configured for more efficient wiring of functions to http endpoints, reacting to business events with serverless functions, and to sharing event subscriptions with other devices.

For example, example devices of system 500 can include a Pipes S3 tool on Amazon, with metadata (e.g., browser type, size of video, what type of video, etc.) then a JavaScript event is fired that indicates it has received the video file. After receipt of the video file is verified, the system can be triggered to send respondent to a thank you page.

For example, example devices of system 500 can include a cold fusion cfml event gateway device 516 which is configured to process data as illustrated in FIG. 4 and described herein. If there is a lot of activity, the queuing device of system 500 can allow for processing one at a time by for example, slowing execution to handle anticipated load.

The cold fusion event gateway device 516 can interact with a VPROC device which is executed for creation of event(s). In an embodiment a VPROC device is a virtual processor or a vproc is a group of one or more software processes running under the operating system's multi-tasking environment.

In an embodiment, a creating device 518 can save raw contents, create video, and set video state to creating, and send a user email thanking for submission. In an embodiment, all execution steps can interact with storage device, such as a cri sql server device 520.

In an embodiment, a pipe type device, e.g., a pipe enabled device, can also have JavaScript type, e.g., JavaScript, launching web hooks configured to make api calls. In an embodiment, one hook can create a video creation process, e.g., sets raw file, the name, and state to created.

In an embodiment, there can be a transcode and image capture for display. Once finished, a video copy can be sent to an S3 type device, e.g., an S3 capable device, and can activate a video transcode device configured to Set vid states, launch moving event into the gateway, and e.g., move the biggest amount of code (raw, sets state, builds thumbnail, shrinking, changing aspect ratio). For example, any one or more of: creating of thank you message transmission, video create device created video transmission, video transcode transmission of transcoded video, and Indexed video data transmission can be processed by a "Moving" box device 522, e.g., a ColdFusion type device, e.g., a ColdFusion capable device 516.

In and embodiment, the "Moving" box device 522 can send the processed data to a video indexer device 514, e.g., an (Azure) type device, e.g., an Azure capable device, configured to make service calls made for processing. The above indicated video information processing as illustrated by the transmission indications in system 500 is an example of an embodiment of content configurations.

In an embodiment, a video indexer device 514 is configured with an object detector, keyword detection, facial, ocr, speaker identification, facial recognition, micro-expressions, and additional detector models it can run. In an embodiment, embeddings in "video indexer product" or device can be leveraged for insights specific to context, intent, time, and place. In an embodiment, the indexing can be completed and then sent to video index device, which can notice that video processing is done. Then indexed video content can be placed in an event queue, which can be transmitted back to the ColdFusion device 516. In an embodiment, backend processing can be accomplished with the ColdFusion device 516. In an embodiment, arbitrated through events can be placed in a queue, e.g., like a stack. In an embodiment, events can get processed in the order added, one at a time, with no multiple call outs, which create can overhead on the server.

In an embodiment, after processed data is saved and video submission process is completed, reviewers can be notified that video is completed and the reviewer can go and check it out. In an embodiment, after processed data is captured and extracted, then there is a notification to a reviewer.

In an embodiment, the ColdFusion device is a lightweight stack, which manages multiple actions, e.g., different people recording, and interleaving one video at a created state, one at a submitted state, while each can be processed in a single file execution.

In an embodiment, calling out to a Simple Storage Service (S3) bucket can be manageable from efficiency perspective. An object of an embodiment can be to manage payload on send/receive, for efficiency. In an embodiment, S3 is an Amazon Simple Storage Service, which is a "simple storage service" offered by Amazon Web Services that provides object storage through a web service interface. S3 can use the same scalable storage infrastructure that Amazon.com uses to run its global e-commerce network.

With embodiments of the disclosure, increasingly sophisticated consumers (i.e., students, constituents, customers) identified as potential respondents can be invited to the forefront to provide input through an accessible format. Campaigns and surveys can be dependent on and can produce real-time metrics. What a consumer says and what they are actually wanting to convey are often two separate messages. By coupling video survey responses with embodiments of the disclosure's tone, theme and sentiment analysis, institutions can have a more robust and reliable data set to quantify the perspective of its users in real-time.

Embodiments of the disclosure can be embodied as a system, a device, a method, and/or a computer program product executable by any combination of hardware, software, and circuitry. The computer program product can include a computer readable storage medium on which computer readable program instructions are recorded that can cause one or more processors to carry out aspects of the embodiment.

The computer readable storage medium can be a tangible device that can store instructions for use by an instruction execution device (processor). The computer readable storage medium can be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in the disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in the disclosure can be downloaded to an appropriate computing or processing device from a computer readable storage medium or to an external computer or external storage device via a global network (i.e., the Internet), a local area network, a wide area network and/or a wireless network. The network can include copper transmission wires, optical communication fibers, wireless transmission, routers, firewalls, switches, gateway computers and/or edge servers. A network adapter card or network interface in each computing or processing device can receive computer readable program instructions from the network and forward the computer readable program instructions for storage in a computer readable storage medium within the computing or processing device.

Computer readable program instructions for carrying out operations of the present disclosure can include machine language instructions and/or microcode, which can be compiled or interpreted from source code written in any combination of one or more programming languages, including assembly language, Basic, Fortran, Java, Python, R, C, C++, C# or similar programming languages. The computer readable program instructions can execute entirely on a user's personal computer, notebook computer, tablet, or smartphone, entirely on a remote computer or compute server, or any combination of these computing devices. The remote computer or compute server can be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) can execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that can implement the systems and methods described in the disclosure can be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions can also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions can also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 6 illustrates an embodiment of a specially configured computer 605 configured in accordance with the disclosure herein and applicable to each device included in the survey system example architecture illustrated in FIGS. 1-5. In an embodiment a survey controller device includes a specially configured computer 605 including circuitry configured to execute each function described herein. In an embodiment a survey controller system includes one or more specially configured computers 605 including circuitry configured to execute each function described herein.

FIG. 6 is a functional block diagram illustrating a networked system 600 of one or more networked computers and servers. In an embodiment, the hardware and software environment illustrated in FIG. 6 can provide an exemplary platform for implementation of the software and/or methods according to the present disclosure.

Referring to FIG. 6, a networked system 600 can include, but is not limited to, computer 605, network 610, remote computer 615, web server 620, cloud storage server 625 and compute server 630. In some embodiments, multiple instances of one or more of the functional blocks illustrated in FIG. 6 can be employed.

Additional detail of computer 605 is shown in FIG. 6. The functional blocks illustrated within computer 605 are provided only to establish exemplary functionality and are not intend to be exhaustive. And while details are not provided for remote computer 615, web server 620, cloud storage server 625 and compute server 630, these other computers and devices can include similar functionality to that shown for computer 605.

Computer 605 can be a personal computer (PC), a desktop computer, laptop computer, tablet computer, netbook computer, a personal digital assistant (PDA), a smart phone, or any other programmable electronic device capable of communicating with other devices on network 610. Computer 605 can include a video capture device (not shown in FIG. 6, but included as described herein).

Computer 605 can include processor 635, bus 637, memory 640, non-volatile storage 645, network interface 650, peripheral interface 655 and display interface 665. Each of these functions can be implemented, in some embodiments, as individual electronic subsystems (integrated circuit chip or combination of chips and associated devices), or, in other embodiments, some combination of functions can be implemented on a single chip (sometimes called a system on chip or SoC).

Processor 635 can be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 637 can be a proprietary or industry standard high-speed parallel or serial peripheral interconnect bus, such as ISA, PCI, PCI Express (PCI-e), AGP, and the like.

Memory 640 and non-volatile storage 645 can be computer-readable storage media. Memory 840 can include any suitable volatile storage devices such as Dynamic Random Access Memory (DRAM) and Static Random Access Memory (SRAM). Non-volatile storage 645 can include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 648 can be a collection of machine readable instructions and/or data that is stored in non-volatile storage 645 and is used to create, manage and control certain software functions that are discussed in detail elsewhere in the present disclosure and illustrated in the drawings. In some embodiments, memory 640 can be considerably faster than non-volatile storage 645. In such embodiments, program 648 can be transferred from non-volatile storage 645 to memory 640 prior to execution by processor 635.

Computer 605 can be capable of communicating and interacting with other computers via network 610 through network interface 650. Network 610 can be, for example, a local area network (LAN), a wide area network (WAN) such as the Internet, or a combination of the two, and can include wired, wireless, or fiber optic connections. In general, network 610 can be any combination of connections and protocols that support communications between two or more computers and related devices.

Peripheral interface 655 can allow for input and output of data with other devices that can be connected locally with computer 605. For example, peripheral interface 655 can provide a connection to external devices 660. External devices 660 can include devices such as a keyboard, a mouse, a keypad, a touch screen, and/or other suitable input devices. External devices 660 can also include portable computer-readable storage media such as, for example, thumb drives, portable optical or magnetic disks, and memory cards. Software and data used to practice embodiments of the present disclosure, for example, program 648, can be stored on such portable computer-readable storage media. In such embodiments, software can be loaded onto non-volatile storage 645 or, alternatively, directly into memory 640 via peripheral interface 655. Peripheral interface 655 can use an industry standard connection, such as RS-232 or Universal Serial Bus (USB), to connect with external devices 660.

Display interface 665 can connect computer 605 to display 670. Display 670 can be used, in some embodiments, to present a command line or graphical user interface to a user of computer 605. Display interface 665 can connect to display 670 using one or more proprietary or industry standard connections, such as VGA, DVI, DisplayPort and HDMI.

As described above, network interface 650, provides for communications with other computing and storage systems or devices external to computer 605. Software programs and data discussed herein can be downloaded from, for example, remote computer 615, web server 620, cloud storage server 625 and compute server 630 to non-volatile storage 645 through network interface 650 and network 610. Furthermore, the systems and methods described in the disclosure can be executed by one or more computers connected to computer 605 through network interface 650 and network 610. For example, in some embodiments the systems and methods described in the disclosure can be executed by remote computer 615, computer server 630, or a combination of the interconnected computers on network 610.

Data, datasets and/or databases employed in embodiments of the systems and methods described in the disclosure can be stored and or downloaded from remote computer 615, web server 620, cloud storage server 625 and compute server 630.

Modifications, additions, or omissions can be made to the systems, apparatuses, and methods described herein without departing from the scope of the disclosure. For example, the components of the systems and apparatuses can be integrated or separated. Moreover, the operations of the systems and apparatuses disclosed herein can be performed by more, fewer, or other components and the methods described can include more, fewer, or other steps. Additionally, steps can be performed in any suitable order. As used in the document, "each" refers to each member of a set or each member of a subset of a set.

To aid the Patent Office and any readers of any patent issued on the application in interpreting the claims appended hereto, applicants wish to note that they do not intend any of the appended claims or claim elements to invoke 35 U.S.C. 112(f) unless the words "means for" or "step for" are explicitly used in the particular claim.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Numerous modifications and variations of the present invention are possible in light of the above teachings. It is therefore to be understood that within the scope of the appended claims, the invention can be practiced otherwise than as specifically described herein.

The invention claimed is:

1. A video submission reviewer system, comprising:
video submission format circuitry configured to generate formatted video submission information from submitted respondent video submission information;
video submission review processing circuitry including:
audio review circuitry configured to analyze the respondent video submission information by any of: prosodic analysis, bias review analysis, intonation analysis, tone analysis, sentiment analysis, theme analysis, adult content detection, transcription, transcription analysis, audio content detection, and audio content analysis;
video review circuitry configured to analyze the respondent video submission information by any of: object detection, adult content detection, video content detection, and video content analysis;
objectionable content review circuitry configured to analyze the respondent video submission information for objectionable content by any of: objectionable content analysis of the transcription of the respondent video submission information, nudity detection, profanity detection, violence detection, abuse detection, and content possible to cause trauma to reviewer detection; and alert circuitry configured to alert upon a detection of objectionable content; and video display circuitry configured to display results indicating an indication of detected objectionable content.

2. The video submission reviewer system of claim 1, further comprising video synthesis circuitry configured to synthesize additional secondary submission information with the formatted video submission information.

3. The video submission reviewer system of claim 2, wherein the additional secondary submission information includes any of meta data, browser type information, video size information, or video type information.

4. The video submission reviewer system of claim 1, wherein the formatted video submission information includes transcoded video submission information including an extracted thumbnail image and an audio transcript.

5. The video submission reviewer system of claim 4, wherein the transcoded video submission information is in an mp4 format and includes an extracted thumbnail image.

6. The video submission reviewer system of claim 1, further comprising video reviewer interface circuitry configured to present reviewer accessible information including processed respondent video submission information.

7. The video submission reviewer system of claim 1, further comprising video submission storage management circuitry configured to:
manage movement and storage of the respondent video submission information or transcoded video submission information for more efficient processing; and
move the respondent video submission information from remote storage to local storage for subsequent processing depending upon a location of processing circuitry.

8. The video submission reviewer system of claim 1, wherein:
the video display circuitry is reviewer interface circuitry configured to present an instance of a reviewer interface screen comprising filter settings including:
a survey or campaign selection, and
a reviewed state selection; and
the instance of the reviewer interface screen includes a list of processed respondent video submission information.

9. The video submission reviewer system of claim 8, wherein the list of the processed respondent video submission information includes at least one of thumbnail information, identification number information, respondent information, date of submission, review status, eligibility status, public or private status, visibility status, reward status, rating value, or date of review action.

10. A method of video submission review, the method comprising:
generating formatted video submission information from submitted respondent video submission information;
processing the respondent video submission information for review by:
analyzing audio of the respondent video submission information by any of: prosodic analysis, bias review analysis, intonation analysis, tone analysis, sentiment analysis, theme analysis, adult content detection, transcription, transcription analysis, audio content detection, and audio content analysis;
analyzing video of the respondent video submission information by any of: object detection, adult content detection, video content detection, and video content analysis;
analyzing for objectionable content by detecting any of: objectionable content analysis of the transcription of the respondent video submission information, nudity detection, profanity detection, violence detection, abuse detection, and content possible to cause trauma to reviewer detection; and
alerting upon a detection of objectionable content; and
displaying results indicating an indication of detected objectionable content.

11. The method of claim 10, further comprising synthesizing additional secondary submission information with the formatted video submission information.

12. The method of claim 11, wherein the additional secondary submission information includes any of meta data, browser type information, video size information, or video type information.

13. The method of claim 10, wherein the formatted video submission information includes transcoded video submission information including an extracted thumbnail image and an audio transcript.

14. The method of claim 13, wherein the transcoded video submission information is in an includes mp4 format and includes an extracted thumbnail image.

15. The method of claim 10, further comprising presenting reviewer accessible information including processed respondent video submission information.

16. The method of claim 10, further comprising:
managing movement and storage of the respondent video submission information or transcoded video submission information for more efficient processing; and
moving the respondent video submission information from remote storage to local storage for subsequent processing depending upon a location of processing circuitry.

17. The method of claim 10, further comprising presenting an instance of a reviewer interface screen comprising filter settings including:
a survey or campaign selection, and
a reviewed state selection,
wherein the instance of the reviewer interface screen includes a list of processed respondent video submission information.

18. The method of claim 17, wherein the list of the processed respondent video submission information includes at least one of thumbnail information, identification number information, respondent information, date of submission, review status, eligibility status, public or private status, visibility status, reward status, rating value, or date of review action.

19. A computer-readable storage medium having computer-readable instructions for programming a processor to perform a method of video submission review, the method comprising:
generating formatted video submission information from submitted respondent video submission information;
processing the respondent video submission information for review by:
analyzing audio of the respondent video submission information by any of: prosodic analysis, bias review analysis, intonation analysis, tone analysis, sentiment analysis, theme analysis, adult content detection, transcription, transcription analysis, audio content detection, and audio content analysis;
analyzing video of the respondent video submission information by any of: object detection, adult content detection, video content detection, and video content analysis;
analyzing for objectionable content by detecting any of: objectionable content analysis of the transcription of the respondent video submission information, nudity detection, profanity detection, violence detection, abuse detection, and content possible to cause trauma to reviewer detection; and alerting upon a detection of objectionable content; and displaying results indicating an indication of detected objectionable content.

20. The computer-readable storage medium of claim 19, wherein the method further comprises presenting an instance of a reviewer interface screen comprising filter settings including:

a survey or campaign selection, and a reviewed state selection, wherein the instance of the reviewer interface screen includes a list of processed respondent video submission information including at least one of thumbnail information, identification number information, respondent information, date of submission, review status, eligibility status, public or private status, visibility status, reward status, rating value, or date of review action.

21. The video submission reviewer system of claim 1, wherein the submitted respondent video submission information is a survey response video.

* * * * *